Aug. 19, 1958 J. C. BARR 2,848,190
RADIAL FLOW TURBO-MACHINES
Filed Sept. 28, 1953 3 Sheets-Sheet 1

INVENTOR
John Charles Barr

BY Stevens, Davis, Miller & Mosher
his ATTORNEYS

Aug. 19, 1958     J. C. BARR     2,848,190
RADIAL FLOW TURBO-MACHINES

Filed Sept. 28, 1953     3 Sheets-Sheet 3

INVENTOR
John Charles Barr

BY Stevens, Davis, Miller & Mosher
ATTORNEYS

United States Patent Office 2,848,190
Patented Aug. 19, 1958

2,848,190

RADIAL FLOW TURBO-MACHINES

John Charles Barr, Ascot, England, assignor to Power Jets (Research & Development) Limited, London, England, a British company Application September 28, 1953, Serial No. 382,799

Claims priority, application Great Britain October 2, 1952

4 Claims. (Cl. 253—39)

This invention relates to radial flow turbo-machines, by which is meant radial inward flow and radial outward flow turbines and centrifugal compressors.

It has been previously proposed to construct a rotor for a radial flow turbo-machine in the form of a hyperboloidal hub member to which separately fabricated blades are affixed. The blades are engaged in the hub member by suitably formed roots with undercut recesses, such as the fir-tree, dovetail or bulb root type already known for axial flow turbines and compressors, cut in the hub. In such a case the recesses can be provided by linear machining for a hyperboloidal body of revolution is generated by the locus of a straight line rotating about an axis with which it has no common plane. In some instances it is not convenient to provide hyperboloidal surfaces on turbo-machine hub but it is always desirable to reduce the difficulty of manufacture of such machines.

The present invention provides a hub member for a radial flow turbo-machine having slots in the surface thereof for the reception of the root portions of separately fabricated blades characterised in this that each slot is formed throughout its length as an arc whose radius is in the plane of entry of the blade root portion into the hub member. Such a slotted hub member can be provided by first forming the hub member of the desired profile and then machining the slots with cutting tools following arcuate paths. The turbo-machine itself is assembled from such a hub member together with blades having root portions formed each throughout its length in an arcuate manner corresponding to the slots.

A blade root may be a free fit in its associated slot, locking means then being provided for preventing the blade becoming disengaged from the hub member. Such locking means may contact the radially inner and radially outer ends of the blades or a projection on the blade root fitting into a recess in the hub member may be used. Where there is no differential expansion problem between the blades and the hub member the blade roots may be closely fitted to their slots and may for instance be welded to them. Alternatively the slots and blade root portions may be correspondingly tapered so that, in operation, centrifugal force locks the blades in position.

The blades themselves may have internal cooling cavities with coolant passages being provided through the hub member to communicate therewith. Apertures may be provided in the blades for instance at the outer periphery of the rotor by means of which coolant fluid may escape from the cavities within the blades into the fluid stream passing through the turbo-machine. The blades are conveniently formed from a sheet metal working portion attached to a separately made root portion.

The invention is equally applicable to single-sided and double-sided rotors and to radial and swept blade turbo-machines.

The invention will now be described by way of example only by reference to certain methods of forming slots in rotors and to a single-sided centripetal turbine embodiment of the invention.

In the accompany drawings:

Figures 1(a), (b) and (c) show respectively a sectional part elevation of a hub member of a radial flow turbo-machine, a part end elevation and a part plan of the same hub member.

Figures 2(a) and (b) show a sectional part elevation of a radial flow turbo-machine and an end elevation thereof respectively.

Figures 3(a), (b) and (c) show respectively an end elevation of a blade root slot in a turbo-machine hub member required to accommodate swept blades, a sectional part view at right angles to the plane of entry of a blade root into that slot and a plan view thereof.

Figure 1A:
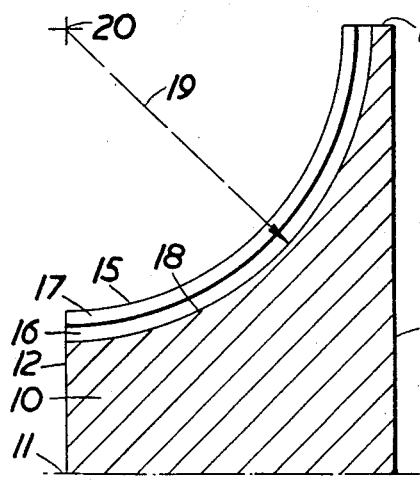
Figure 1B:
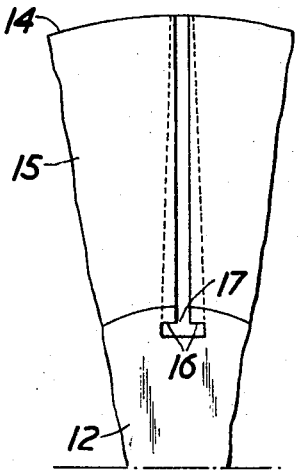
Figure 1C:
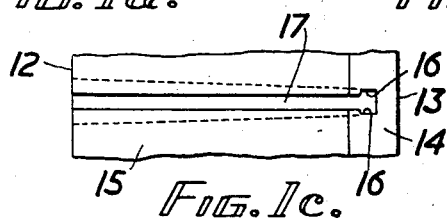

Turning now to the three views of Figure 1 there will be seen a hub member 10 which is symmetrically formed about the axis 11. It has front and rear end faces 12 and 13 respectively and a peripheral surface comprising an arcuate portion 15 and a cylindrical portion 14. Into the arcuate portion 15 of the hub member slots are to be formed for the reception and engagement of separately fabricated blades. One suitable form of slot is shown having undercut recesses 16 and a throat part 17. The bottom of the slot 18 is cut on an arc as are also the recesses 16. The slot is conveniently provided by setting up the hub member 10 on a machine tool which is equipped firstly for the milling out of an arcuate groove on the radius 19 from the centre 20. This groove is of the width of the throat 17 and the cut is made to the depth required for the bottom of the slot 18. Having cut the groove a tool or tools to cut the recesses 16 replaces the milling cutter.

It will be appreciated that with a slot formed by cutting operations all defined by the centre 20 a separately fabricated blade having a blade root portion of complementary arcuate formation can be inserted into the end of the slot and slid along into position. With a tapered slot and a tapered blade root portion the blade is inserted at the radially inner end of the slot and slid into place until the tapering tightens it into position. Such tapering arrangement prevents the root-portion from sliding beyond a predetermined point and causes the blade to lock tightly in its slot during operation for centrifugal force increases the wedging effect. Each slot in the hub member is formed in exactly the same way and all slots can be machined with the hub member only once being set up in position. The separate blade roots slots are cut at accurately determined positions by rotary displacement of the hub member. Where the slot is tapered as described above the width of the throat may also taper from inner to outer radius and this is advantageous if the blade entered is itself of tapered thickness.

Figure 2A:
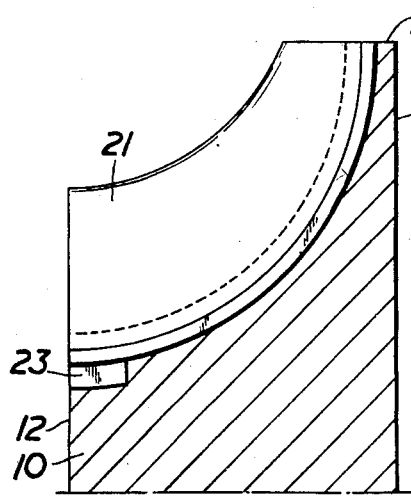
Figure 2B:
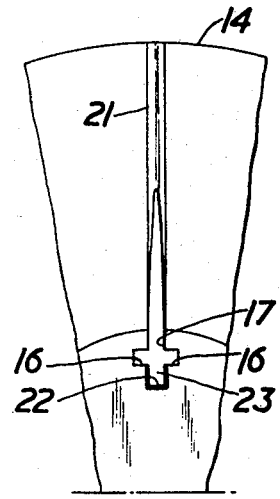

In the Figures 2(a) and 2(b) a blade 21 is shown inserted in the hub member 10. This blade has a locking means which may either be alternative to the tapering of the slot or additional thereto. Each slot in the hub member has a radially directed recess at a radially inner end of the slot. This recess is shown at 22. A projection 23 at the end of the blade root portion fits into the recess 22 when the blade is assembled into the hub member. In both this instance and in the instance of the tapered slot the blade may require means for preventing it becoming disengaged from the slot from the radially inner end but in both cases in operation the blade is prevented from sliding beyond a predetermined point and flying out at the periphery.

Figures 3A, 3B:
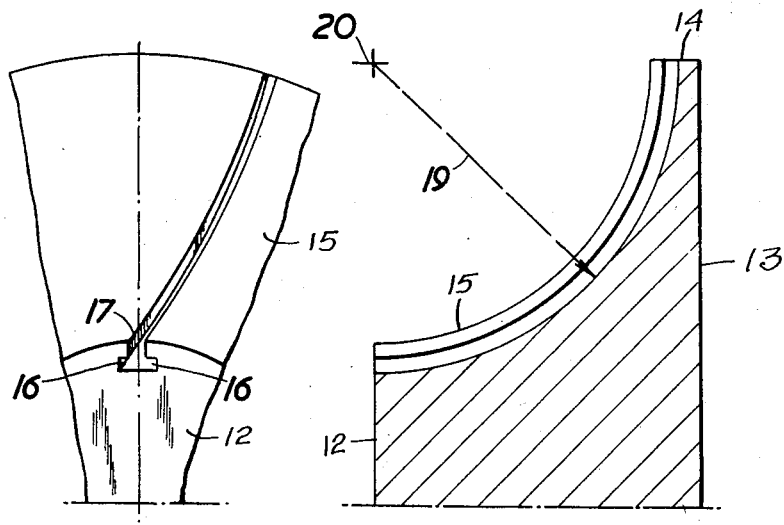
Figure 3C:
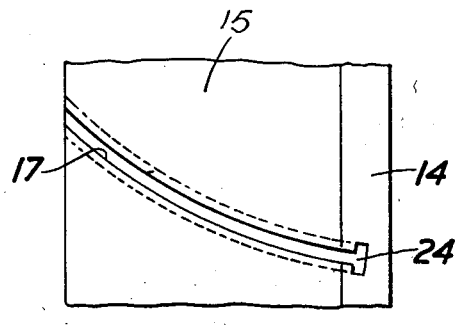

In Figures 3(a), 3(b) and 3(c) the blades are skewed instead of being radial as shown in Figures 1 and 2. Skewed blades can be accommodated and all that needs to be done in order to obtain suitable blade root retaining slots is to skew the hub member relative to the cutting tools and to cut the slot on the radius as before. The hub member will again have two end faces 12 and 13 and a peripheral surface joining the end faces divided axially into an arcuate portion 15 and a cylindrical portion 14. Figure 3(b) which is a view taken at right angles to the plane of the blade root slot is similar to Figure 1(a) and clearly shows the circular arcuate nature of the slot. As shown in Figure 3(a) the slot at its radially inner end has its bottom normal to the radius. As the slot is skewed however the root slot appears on the skew at the outer diameter as shown at 24 in Figure 3(c). As shown in Figure 3(b) the depth of the slot is constant. In order for the slot to be in the shape of a circular arc and the depth of the slot to be constant, the arcuate portion 15 of the peripheral surface must be in the shape generated by a circular arc oblique to the axis of generation. For symmetry, of course, the axis of generation must be the rotational axis of the hub member. The slots must each lie in a plane which is skewed relatively to a plane containing a rotational axis at such an angle that the intersection of the skewed plane and the arcuate portion 15 of the surface defines a locus of the circular arc which generates the shape of the arcuate portion 15 of the peripheral surface. Alternatively slotting can be arranged so that the slots are normal to a radius at some mid position and therefore skewed in different senses at the two ends. As the blade root portions are formed in exactly complementary fashion the blades can still be slid in from either end of the slot unless that slot is tapered, in which case the blade has to be entered in the direction of the taper.

Figure 4:
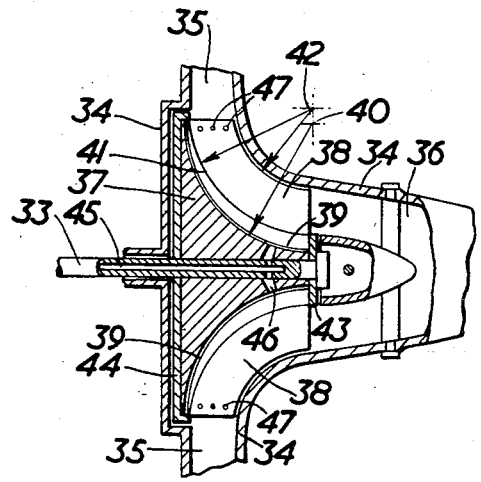
Figure 4 is a sectional elevation of the centripetal turbine embodiment showing the general arrangement of the machine.

The manner in which the invention is embodied in the rotor of a turbo-machine is clearly seen in Figure 4. The hub member is mounted upon the shaft 33 and runs within the casing 34. The casing provides the inlet duct for the motive fluid for the turbine at 35 and the outlet duct at 36. The hub member is single-sided and is shown at 37, the blades 38 being attached to its periphery. The blade roots 39 engage in slots in the hub member, the slot base being on a radius from the point 40. In the embodiment shown the profile of the hub member is also arcuate, it is shown at 41, but it does not have the same centre. The centre for the profile 41 lies on a circle concentrically around the axis of the machine and at right angles to that axis and including the point 42. In the simple case shown where radial blades are incorporated the two centres 40 and 42 for any blade and blade root slot are in the same plane with the blade itself.

The blade root 39 is entered into the blade root slot from either end and angular movement of the blade in the slot enables it to be positioned appropriately upon the hub member as previously described. The freedom of the blade root in its slot is advantageous for the allowance of expansion during operation of the machine. In the example shown the blade is retained in its correct position relative to the hub member by locking stops at the radially inner and outer ends. The stop at the inner end is provided by a disc 43 mounted upon the shaft. This disc engages with the end of the blade root and prevents it from getting out of position relative to the hub member. The disc 43 is preferably not in tight engagement with the end of the hub member and the blade root. At the radially outward end of the blade the blade root is engaged by the turned over edge of the disc 44 attached to the back of the hub member. Again the edge does not tightly engage the periphery of the hub member and the blade root for thermal expansion has to be allowed for. It is assumed in the figure that the blades are constructed of sheet metal and are hollow with cooling cavities inside them. A flow of coolant fluid is introduced via the hollow shaft 33 through the passage 45 which connects via passages 46 in the hub member itself to the interior of the blades via their roots. Wall apertures in the outer ends of the blades are shown at 47 and through these the coolant fluid escapes into the duct through which the motive fluid is passing. The coolant flow is assisted by the centrifugal pumping action of the rotor during operation.

Figure 5:
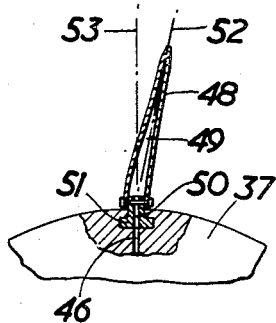
Figure 5 is a scrap section illustrating the attachment of a blade to the hub member, the blade being made of sheet metal and the plane of the blade not coinciding with the plane of entry of the blade root into the hub member.

In Figure 5 there is shown a hollow sheet metal blade 48 having an internal cavity 49 for the passage of coolant fluid. The coolant fluid is passed out from the centre of the hub member through the passage 46 as has already been suggested in the above description and via the bored hole 50 in the blade root it passes to the interior of the blade. In this instance however there is a separately fabricated blade root 51 from the blade itself shown at 48. The blade root extends beyond the surface of the hub member 37 and the opposite sides of the blade are riveted on to the blade root itself.

Another feature shown in this figure is the way in which the plane 52 of the blade 48 need not coincide with the plane of entry of the blade root into the hub member which latter plane is shown at 53. It will be clear that the centre of the radius employed for the cutting operation of the blade root slot in the hub member lies on the plane 53.

In small sizes of machines where it is required to accommodate fair numbers of blades on a small radius hub member it may be advantageous to use separately fabricated blade root and working portions as has been shown in Figure 5. In this way a narrower slot in the hub member can be provided than if the blade and blade root were in one piece.

The invention is particularly useful in applications to embodiments where there is considerable differential expansion between the blades and the hub member because it allows such easy and free expansion. This of course may occur where the motive fluid passing through the turbo-machine is either very hot or very cold. Where there is no appreciable differential expansion the blade root can conveniently be welded to the slot in which it is inserted.

Where coolant fluid is allowed to pass into or through the blades that fluid may conveniently be air, water, steam or other coolant fluid depending upon the application to which the turbo-machine is to be put.

What I claim is:

1. A rotor for a radial-flow turbo-machine comprising a hub member having a rotational axis, two axially spaced end faces, a peripheral surface joining said end faces, said peripheral surface being divided axially into a cylindrical portion and an arcuate portion, said arcuate portion having a shape generated by a circular arc oblique to said rotational axis, the shape of said arcuate portion having said rotational axis as its axis of generation, the radial distance between said rotational axis and the arcuate portion of said peripheral surface increasing from one of said end faces to the cylindrical portion of said peripheral surface, a plurality of slots formed in said hub member adapted to receive and retain root-portions of separately fabricated blades, each of said slots having means to prevent slipping of the root-portion beyond a predetermined point through the slot in the direction of increasing radial distance between said rotational axis and the arcuate portion of said peripheral surface, each of said slots being of constant depth and arcuate throughout its length and lying lengthwise in a plane skewed relatively to a plane containing said rotational axis at such an angle that the intersection of said skewed plane and the arcuate portion of said peripheral surface defines a locus of said circular arc.

2. A rotor according to claim 1, in which said means of said slots to prevent said slipping of the root-portions consists of said slots having a taper in the direction of increasing radial distance between said rotational axis and the arcuate portion of said peripheral surface.

3. A bladed rotor for a radial flow turbo-machine comprising a hub member having a rotational axis, and a peripheral surface having an arcuate portion of a shape generated by a circular arc oblique to said rotational axis, the shape of said arcuate peripheral surface having said rotational axis as its axis of generation, a plurality of slots formed in said hub member, each of said slots being of constant depth and arcuate throughout its length and lying lengthwise in a plane skewed relatively to a plane containing said rotational axis at such an angle that the intersection of said skewed plane and said peripheral surface defines a locus of said circular arc, and root portions forming part of said blades, each of said root portions having an arcuate form corresponding to the arcuate form of the slots and being cooperatively engaged therein, said root portions and said slots defining mutually coacting means to retain said root portions in said slots and to prevent the slipping of said root portions beyond a predetermined point in one direction through said slots.

4. A bladed rotor for a radial flow turbo-machine comprising a hub member having a rotational axis, two axially spaced end faces, a peripheral surface joining said end faces, said peripheral surface being divided axially into a cylindrical portion and an arcuate portion, said arcuate portion having a shape generated by a circular arc oblique to said rotational axis, the shape of said arcuate portion having said rotational axis as its axis of generation, the radial distance between said rotational axis and the arcuate portion of said peripheral surface increasing from one of said end faces to the cylindrical portion of said peripheral surface, a plurality of slots formed in said hub member, each of said slots being of constant depth and arcuate throughout its length and lying lengthwise in a plane skewed relatively to a plane containing said rotational axis at such an angle that the intersection of said skewed plane and the arcuate portion of said peripheral surface defines a locus of said circular arc, a recess being formed at the bottom of each slot from one of said end faces of said hub member in the direction of the increasing radial distance between said rotational axis and the arcuate portion of said peripheral surface, a plurality of blades, root portions forming part of said blades, the root portions of said blades cooperatively engaged in said slots, said root portions and said slots defining coacting means to retain said root portions in said slots, and a projection formed upon the root portion of each of said blades, and each projection cooperating with one of said recesses to prevent the slipping of the root portion beyond a predetermined point through the slot in the direction of increasing radial distance between said rotational axis and the arcuate portion of said peripheral surface.

References Cited in the file of this patent

UNITED STATES PATENTS

| | | |
|---|---|---|
| 1,535,417 | Huff | Apr. 28, 1925 |
| 1,563,465 | Breitenstein | Dec. 1, 1925 |
| 1,718,061 | Miller | June 18, 1929 |
| 1,803,223 | Wagner | Apr. 28, 1931 |
| 1,868,146 | Kiep | July 19, 1932 |
| 1,877,347 | McMurdie | Sept. 13, 1932 |
| 2,633,776 | Schenk | Apr. 7, 1953 |

FOREIGN PATENTS

| | | |
|---|---|---|
| 307,832 | Great Britain | Oct. 24, 1929 |
| 662,517 | Great Britain | Dec. 5, 1951 |
| 976,790 | France | Nov. 1, 1950 |